United States Patent [19]

Wilkinson

[11] Patent Number: 4,595,731

[45] Date of Patent: Jun. 17, 1986

[54] WATER SOLUBLE POLYAMINES AND PROCESS FOR THEIR PREPARATION

[75] Inventor: William K. Wilkinson, Waynesboro, Va.

[73] Assignee: E. I. Du Pont de Nemours and Company, Wilmington, Del.

[21] Appl. No.: 771,147

[22] Filed: Aug. 29, 1985

Related U.S. Application Data

[60] Continuation-in-part of Ser. No. 654,198, Sep. 24, 1984, abandoned, which is a division of Ser. No. 492,488, May 6, 1983, abandoned.

[51] Int. Cl.[4] ............................................... C08F 8/32
[52] U.S. Cl. ............................ 525/329.1; 525/329.2; 525/329.3; 525/345; 525/346; 525/354; 525/382; 526/310
[58] Field of Search ............... 525/345, 346, 354, 382, 525/329.1, 329.2, 329.3; 526/310

[56] References Cited

U.S. PATENT DOCUMENTS

| | | | |
|---|---|---|---|
| 4,013,710 | 3/1977 | Skillicorn | 525/379 |
| 4,041,006 | 8/1977 | Fong et al. | 525/353 |
| 4,254,250 | 3/1981 | Glowaky et al. | 525/382 |
| 4,304,888 | 12/1983 | Calvert et al. | 525/382 |

*Primary Examiner*—Joseph L. Schofer
*Assistant Examiner*—Bernard Lipman

[57] ABSTRACT

Water soluble polyamines useful as flocculating agents are prepared by reaction of acrylonitrile polymers in solution with dialkylaminoalkylamines using ammonium polysulfide as catalyst.

6 Claims, No Drawings

WATER SOLUBLE POLYAMINES AND PROCESS FOR THEIR PREPARATION

REFERENCE TO PRIOR APPLICATION

This application is a continuation-in-part of application Ser. No. 654,198 filed Sept. 24, 1984, abandoned which is a divisional of application Ser. No. 492,488 filed May 6, 1983 abandoned.

TECHNICAL FIELD

This invention relates to water soluble polyamines derived from acrylonitrile polymers which are useful in de-watering suspensions of particulate matter in water. The invention includes a novel process for preparing the polyamines.

BACKGROUND OF THE INVENTION

A number of different water soluble products derived from acrylonitrile polymers are known in the art. In general these products are prepared by reaction of amines with acrylonitrile using sulfur or a sulfur compound as catalyst, usually in the presence of water.

U.S Pat. No. 4,254,250 discloses reaction of an acrylonitrile polymer with an aminating agent which may be 3-dimethylaminopropylamine at 80°–120° C. under nitrogen. The mixture is heated 1-2 hours at the reaction temperature before addition of sulfur or a sulfur compound catalyst. No solvent for the acrylonitrile polymer is used.

U.S. Pat. No. 3,406,139 discloses preparation of vinylimidazoline and vinyltetrahydropyrimidine polymers by reaction of an acrylonitrile polymer with a primary aliphatic diamine, a secondary-primary aliphatic diamine or certain polyamines at 90°–120° C. in the presence of sulfur or a sulfur containing compound. The reaction may be carried out using a solvent for the acrylonitrile polymer but is preferably carried out in a non-solvent for the acrylonitrile polymer. Similar products are prepared in U.S. Pat. No. 4,041,006 in an inert atmosphere.

U.S. Pat. No. 3,647,769 discloses a process for making water soluble products by reacting a slurry of acrylonitrile polymer with water and a primary or secondary mono- or polyamine at 80°–250° C. for 16 or more hours. The products are believed to be N-substituted poly(acrylamides).

The known water soluble products derived from acrylonitrile polymers have been shown to be more effective than alum and other organic reagents in the removal of particulate matter from municipal and industrial waste and sludge.

BRIEF DESCRIPTION OF THE INVENTION

The present invention provides a new water soluble, non-crosslinked polyamine useful in de-watering suspensions of particulate matter in water. The polyamine has the structure

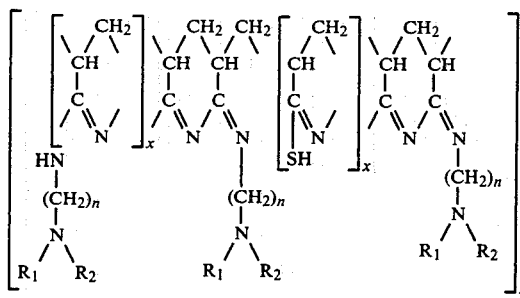

where z is 25 to 200, n is 2 to 20, preferably 2 to 4, and $R_1$ and $R_2$ are 1 to 4 carbon alkyl groups and $x = 1$ to 4.

The polyamines have a neutralization equivalent of 100 to 200, preferably 130 to 150. The above structure is supported by spectrographic data which show the absence of free nitrile, amide, imidazoline or primary amine absorptions. For example, there is no absorption at 320 nm, the frequency characteristic of the imidazoline group. IR Spectra data shows continuous IR absorption from 1660 to 1540 cm$^{-1}$ with no distinct peaks. IR Spectra also shows peaks at 1030 and 760-770 cm$^{-1}$. The absence of amide absorptions is shown by the absence of a peak at 1640 cm$^{-1}$.

This invention also provides a process for preparing the water soluble polyamine by reaction of a solution of an acrylonitrile polymer with a diamine containing primary and tertiary amino groups in the presence of air and an ammonium polysulfide catalyst or a sulfur containing catalyst convertible to ammonium polysulfide under the conditions of the reaction. Preferably the ammonium polysulfide catalyst is deactivated, e.g., with hydrogen Peroxide before working up the reaction mixture. The reaction is carried out for 4 to 60 minutes, preferably at 90° to 100° C. The amount of diamine used must be at least 0.5 mols and preferably is 0.5 to 2.0 mols per acrylonitrile repeating unit in the acrylonitrile polymer. Most preferably, 1.0 mol of diamine is used per acrylonitrile repeating unit. The amount of catalyst used is 0.02 to 0.20 mols (based on S) per acrylonitrile repeating unit in the acrylonitrile polymer. The acrylonitrile polymer concentration is not critical and may conveniently be in the range of 10 to 30% by weight.

The acrylonitrile polymers useful in the present invention contain at least 80% by weight acrylonitrile. In addition to homopolymeric poly(acrylonitrile), copolymers with any of the art-recognized monomers capable of copolymerization with acrylonitrile are useful. Comonomers such as methyl acrylate, methyl methacrylate, styrene. acrylic acid, sodium styrene-sulfonate, sodium 3-acrylamido-2-methylpropane sulfonate, acrylamide and N-vinylpyrrolidone have been demonstrated to be useful.

Useful diamines consist of a primary amino group and a tertiary amino group separated by a 2-20 C, preferably 2-4 C, alkylene group or an arylene group. The substituents on the tertiary amino group are 1 to 8 C. alkyl groups. The most preferred diamine is 3-dimethylaminopropylamine (DMAPA). Another useful diamine is asymetrical diethyl ethylenediamine. Diamines having only primary amino groups are not useful because they tend to cause cross-linking. Primary monoamines do not provide water soluble products in the process of the invention.

The catalyst used is ammonium polysulfide or a sulfur containing material which is converted to ammonium polysulfide under the conditions of the reaction. In the presence of air H$_2$S and ammonium sulfide are convertible to ammonium polysulfide under the conditions of the reaction. Ammonium polysulfide is a very active catalyst and can cause cross-linking unless de-activated before the reaction mixture is worked up. The catalyst is preferably deactivated with a stoichiometric amount of hydrogen peroxide. The catalyst may also be de-activated with a mixed ion exchange resin or a stoichiometric amount of a ferrous salt. De-activation of the catalyst may not be necessary if the isolation conditions are mild, e.g., when temperatures below 60° C. are used.

Useful acrylonitrile polymer solvents include N,N-dimethylformamide, N,N-dimethylacetamide and other known solvents for such polymers. However the solvent must not react with the ammonium polysulfide catalyst. For example, 60% aqueous zinc chloride is not a useful solvent while 60% aqueous potassium thiocyanate is a useful solvent.

Water does not interfere with the process of the present invention. Similar results are obtained whether or not water is present.

The water soluble polyamine of the present invention can be used as is, that is dissolved in the acrylonitrile polymer solvent used in its preparation, or the solvent and any excess diamine can be recovered and the solid polyamine dissolved in water. The polyamine is an excellent flocculating (de-watering) agent either as the free base or as an acid salt. The polyamines are effective flocculating agents over a wide range of pH (4–11). They are effective over a wide range of concentration of 0.1 to 100 parts per million without peptizing and re-suspending particulates.

TEST METHODS

Procedure for Determinino U.V. Spectra p The dry polymer was dissolved in water at room temperature at 100 ppm. The pale yellow solution was scanned from 400 nm to 200 nm on a Perkin-Elmer 522A UV/visible spectrophotometer.

Procedure for Determining I.R. Spectra

The dry Polymer was dissolved at room temperature in dimethylformamide at about 20% solids. A thin film was cast onto a NaCl crystal plate and evaporated to dryness at 100° C. The resulting film was scanned on a Perkin-Elmer Model 823 Infra-Red spectrophotometer using standard settings.

EXAMPLE 1

265 g (4.7 mols) of an acrylonitrile/methyl acrylate copolymer containing 94% by weight acrylonitrile and 6% by weight methyl acrylate, 510 g (5 mols) of dimethylaminopropylamine (DMAPA) and 1116 ml N,N-dimethylformamide (DMF) were placed in a 3-liter 3-necked flask fitted with a stirrer, thermometer and reflux condenser. The mixture was heated on a steam bath with stirring until the polymer dissolved. 123 ml of 22% aqueous ammonium sulfide was mixed with 100 ml DMF containing 0.4 g (0.0125 mol) dissolved sulfur (8 mol percent total S based on copolymer) and added to the polymer-diamine solution. The mixture was heated at 75° C. with stirring for one hour. Bubbles of ammonia were evolved initially, slowing after 0.5 hours and ceasing after one hour. 30 ml of 50% hydrogen peroxide was added to deactivate the catalyst. Solvent and unreacted DMAPA were removed by distillation at 70° C. under reduced pressure. 118 g unreacted DMAPA was recovered. The yield of orange polyamine was 576 g (88%). The polyamine was dissolved in water to form a 25% solution which was diluted to 10% for storage.

The above procedure was repeated, omitting the ammonium polysulfide catalyst. After two hours at 90° C., the reaction product was still insoluble in water.

The above procedure was repeated except that hydrogen sulfide was used as the catalyst. A water soluble product was obtained after 6 minutes at 80° C.

EXAMPLE 2

5.30 g (0.094 mol) of an acrylonitrile/methyl acrylate/sodium styrenesulfonate copolymer containing 94 percent by weight acrylonitrile and 6% by weight methyl acrylate, 50 ml of DMF and 12.6 ml DMAPA (0.1 mol) were placed in a three-necked flask and heated on a steam bath with stirring until a solution was obtained. 1.6 ml of 22% aqueous ammonium polysulfide (5 mol percent on copolymer) was added and the mixture was heated at 75°–80° C. with stirring for two hours. 0.5 ml 50% H$_2$O$_2$. Was added and the solvent and unreacted DMAPA were removed by distillation under reduced pressure (20 mm). 65 ml of condensate containing 4.28 g DMAPA (by titration) were obtained. The yield of polyamine was 11.70 g (100.3% of theory). The neutralization equivalent of the polyamine was 134, 154.

EXAMPLE 3

This example shows that the reaction can be run under essentially anhydrous conditions. 5.30 g (0.094 mol) of an acrylonitrile/methyl acrylate copolymer containing 94% by weight acrylonitrile and 6% by weight methyl acrylate, 50 ml of DMF and 12.6 ml DMAPA (0.1 mol) were heated with stirring on a steam bath until a solution was obtained. DMF containing anhydrous hydrogen sulfide (10 mol percent based on copolymer) was added and the mixture was heated at 100° C. with stirring. The green mixture became orange after 15 minutes. A water soluble product was obtained after 50 minutes. 50% hydrogen peroxide was added to deactivate the catalyst. The reaction mixture contained 0.003 mols water from the DMF, this is only 0.03 mols water per mol nitrile group in the copolymer. Addition of hydrogen peroxide raised the water content of the reaction mixture to 0.2 mol per mol nitrile group in the copolymer. Visible, ultraviolet and infrared spectra of the product polyamine were similar to the corresponding spectra obtained for the polyamine of example 1 which was prepared in a system containing 1 mol water per mol of nitrile group.

EXAMPLE 4

This example shows use of recovered solvent and unreacted DMAPA from example 1. 265 g (4.7 mols) of an acrylonitrile/methyl acrylate copolymer containing 94% by weight acrylonitrile and 6% by weight methyl acrylate, 1060 ml DMF (60 ml recovered) and 510 g DMAPA (5 mols, 118 g recovered) was heated at 80° C. with stirring until a solution was obtained. 50 ml 22% aqueous ammonium sulfide and 100 ml DMF was added (3 mol percent S based on copolymer). The reaction ran well initially as evidenced by evolution of ammonia but subsided and after 1.3 hours the product was still insoluble in water. 27 ml additional 22% ammonium sulfide and 50 ml DMF was added to provide a total of 5 mol percent S based on copolymer. The evolution of ammonia resumed and a water soluble product was obtained diameter Whatman No. 2 filter paper. Filtration times were measured.

| Sample | | Additive | Substrate | Flow time, seconds | lbs/ft$_2$/hr | Additive ppm |
|---|---|---|---|---|---|---|
| 1 | | None | 100 ml water | 8 | — | 0 |
| 2 | | None | 100 ml 1% sludge | 60 | 3.5 | 0 |
| 3 | 0.1 ml | 10% polyamine | 100 ml 1% sludge | 27* | 7.7 | 100 |
| 4 | 1 ml | 0.1% polyamine | 100 ml 1% sludge | 25* | 8.4 | 10 |
| 5 | 0.1 ml | 0.1% polyamine | 100 ml 1% sludge | 52* | 4.0 | 1 |
| 6A | 1.0 ml | 0.1% polyamine HCl salt** | 100 ml 1% sludge | 17*** | 12.3 | 10 |
| 6B | 1.0 ml | 0.1% polyamine HCl salt** | 100 ml 1% sludge | 25*** | 8.4 | 10 |

*pH = 7.8
**pH = 3.3
***pH = 7.1 in an additional 0.5 hours. 117 ml of 50% hydrogen peroxide was added to deactivate the catalyst. The solvent and unreacted DMAPA were removed by distillation under reduced pressure leaving 564 g polyamine. 151 g DMAPA was recovered.

EXAMPLE 5

Example 2 was repeated except that 8.8 g asymetrical dimethyl ethylenediamine (0.1 mol) was substituted for the DMAPA, the reaction was carried out at 110° C. for 30 minutes and 3.125 mol percent ammonium sulfide was used as catalyst. Volatile materials were removed by evaporation under reduced pressure at 60° C. A water soluble product was obtained.

EXAMPLE 6
(99-4)

Example 2 was repeated except 16 ml DMAPA (6.35) mol % based on polymer) was used, the reaction was begun at 70° C. but surged to 100° C. (complete in 10 minutes) and 6.5 mol percent ammonium sulfide was used as catalyst. The volatile materials were removed by evaporation under reduced pressure and the residue were dissolved in water to form a 10% solution. The pH of the solution was 10.3.

Various amounts of this solution were added to a 1% solids sludge obtained from Du Pont's Waynesboro, Va. waste treatment facility, the mixtures were stirred 30 seconds and then filtered under suction through 7 cm

What is claimed is:

1. A water soluble polyamine polymer having cyclic conjugated polyazomethine groups as part of the polymer backbone, comprised of the following structure

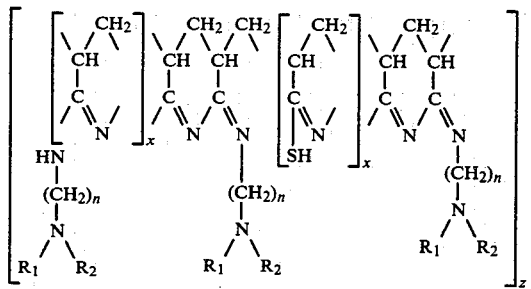

where z is 25–200, n is 2–20, $R_1$ and $R_2$ are 1–4 carbon alkyl groups and X is 1–4.

2. The polymer of claim 1 further characterized by no UV absorption in 320 nm.

3. The polymer of claim 2 wherein n is 2–4.

4. The polymer of claim 3 characterized by a neutralization equivalent of 100–250.

5. The polymer of claim 4 wherein the neutralization equivalent is 130–150.

6. The polymer of claim 5 further characterized by containing essentially no nitrile groups.

* * * * *